(12) United States Patent
Hicks et al.

(10) Patent No.: US 9,092,606 B2
(45) Date of Patent: *Jul. 28, 2015

(54) BIOMETRIC SENSOR FOR HUMAN PRESENCE DETECTION AND ASSOCIATED METHODS

(71) Applicant: APPLE INC., Cupertino, CA (US)

(72) Inventors: Glenn Hicks, Humble, TX (US); Richard Franklin Albury, Broadlands, VA (US); James Warren Neil, Melbourne, FL (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/167,378

(22) Filed: Jan. 29, 2014

(65) Prior Publication Data

US 2014/0150091 A1    May 29, 2014

Related U.S. Application Data

(63) Continuation of application No. 12/704,757, filed on Feb. 12, 2010, now Pat. No. 8,656,486.

(51) Int. Cl.
*G06F 21/00* (2013.01)
*G06F 21/32* (2013.01)
(Continued)

(52) U.S. Cl.
CPC .............. *G06F 21/32* (2013.01); *G06F 21/316* (2013.01); *H04L 63/0861* (2013.01); *G06F 2221/2133* (2013.01)

(58) Field of Classification Search
CPC ...... G06F 21/35; G06Q 20/40; G06Q 20/341; G07F 7/1008
See application file for complete search history.

(56) References Cited

U.S. PATENT DOCUMENTS 5,940,526 A    8/1999    Setlak et al.
5,953,441 A    9/1999    Setlak
(Continued)

FOREIGN PATENT DOCUMENTS

JP    2002502519    1/2002
JP    2008541290    11/2008
WO    2006123339    11/2006

OTHER PUBLICATIONS

May, "Inaccessibility of CAPTCHA", W3C (MIT, ERCIM, Keio), Section 3.5.3, Nov. 2005, pp. 1-9.
(Continued)

*Primary Examiner* — Kambiz Zand
*Assistant Examiner* — Ghodrat Jamshidi
(74) *Attorney, Agent, or Firm* — Allen, Dyer, Doppelt, Milbrath & Gilchrist, P.A.

(57) ABSTRACT

An electronic device may include a communications interface, a user prompting device, a biometric sensor, and a controller. The controller may perform biometric spoof detection with the biometric sensor, and receive a request for human presence verification from a remote device via the communications interface. The controller may also prompt the user for a verification action using the sensor based upon receiving the request, and determine that the user has completed the verification action in response to the prompting and based upon the biometric spoof detection. The controller may further send a response to the remote device via the communications interface and based upon determining that the user has completed the verification action. The controller may send a notification to the remote device that there is a biometric sensor.

20 Claims, 7 Drawing Sheets

(51) Int. Cl.
*G06F 21/31* (2013.01)
*H04L 29/06* (2006.01)

(56) References Cited

U.S. PATENT DOCUMENTS

| | | | |
|---|---|---|---|
| 6,914,517 B2 | 7/2005 | Kinsella | |
| 6,963,659 B2 | 11/2005 | Tumey et al. | |
| 7,116,805 B2 | 10/2006 | Machida | |
| 7,460,696 B2 | 12/2008 | Rowe | |
| 7,552,467 B2 | 6/2009 | Lindsay | |
| 2004/0164848 A1* | 8/2004 | Hwang et al. | 340/5.82 |
| 2005/0093834 A1 | 5/2005 | Abdallah et al. | |
| 2005/0114705 A1 | 5/2005 | Reshef et al. | |
| 2006/0008128 A1* | 1/2006 | Setlak et al. | 382/124 |
| 2006/0047766 A1 | 3/2006 | Spadea, III | |
| 2006/0265340 A1 | 11/2006 | Ziv et al. | |
| 2007/0014443 A1 | 1/2007 | Russo | |
| 2007/0201745 A1 | 8/2007 | Wang et al. | |
| 2008/0009345 A1 | 1/2008 | Bailey et al. | |
| 2008/0034219 A1 | 2/2008 | Ting | |
| 2008/0177569 A1 | 7/2008 | Chen et al. | |
| 2009/0089588 A1* | 4/2009 | Adrangi et al. | 713/183 |
| 2009/0132424 A1 | 5/2009 | Kendrick et al. | |
| 2009/0153292 A1 | 6/2009 | Farb | |
| 2009/0309698 A1* | 12/2009 | Headley et al. | 340/5.52 |
| 2009/0316963 A1 | 12/2009 | Boshra | |

OTHER PUBLICATIONS

Gossweiler et al., "What's Up CAPTCHA? A CAPTCHA Based on Image Orientation", Intl World Wide Web Conference Committee, Apr. 2009, pp. 1-10.

Kanneh et al., "Biometric User Verification Using Haptics and Fuzzy Logic", MM08, Vancouver, BC, Canada, Oct. 2008, pp. 937-940.

Rahman et al., "An Efficient Technique for Human Verification Using Finger Stripes Geometry", International Journal of Soft Computing, 2007, pp. 445-449.

Shankland, "What's up bot? Google tries new Captcha method", CNET News, Webware, Apr. 2009, pp. 1-3.

\* cited by examiner

BIOMETRIC SENSOR FOR HUMAN PRESENCE DETECTION AND ASSOCIATED METHODS

FIELD OF THE INVENTION

The present invention relates to the verification, and, more particularly, to human presence verification and related methods.

BACKGROUND OF THE INVENTION

A Completely Automated Public Turing test to tell Computers and Humans Apart (CAPTCHA) may be used to prevent automated software from performing actions, which degrade the quality of service of a given system, whether due to abuse or resource expenditure. A CAPTCHA may be used to protect a computer system from e-mail spam, such as the webmail services.

A CAPTCHA is a type of challenge-response test used in computing to ensure that the response is not generated by a computer. The process typically involves one computer asking a user to complete a simple test which the computer is able to generate and grade. Because other computers are unable to solve the CAPTCHA, any user entering a correct solution is presumed to be human. A common type of CAPTCHA involves a user typing letters or digits from a distorted image that appears on the screen. For example, a checkbox that says "check here if you are not a bot" might serve to distinguish between humans and computers, but it is not a CAPTCHA because it relies on the fact that an attacker has not spent effort to break that specific form. Such "check here" methods are usually defeated relatively easily.

Because a typical CAPTCHA relies on visual perception, a user unable to view a CAPTCHA, for example, due to a disability or because it is difficult to read, may be unable to perform the task protected by a CAPTCHA. Accordingly, a site implementing a CAPTCHA may provide an audio version of the CAPTCHA in addition to the visual method.

Even an audio and visual CAPTCHA may require manual intervention for some users, such as those who have visual disabilities and are also deaf. Attempts at creating CAPTCHAs that are more accessible include the use of JavaScript, mathematical questions ("what is 1+1"), or "common sense" questions ("what color is the sky on a clear day"). However, they do not meet both the criteria of being able to be automatically generated and not relying on the type of CAPTCHA being new to the attacker.

Many CAPTCHA implementations are prone to common attacks. For example, a CAPTCHA may be defeated by exploiting bugs in the implementation that allow the attacker to completely bypass the CAPTCHA, improving character recognition software, or using cheap human labor to process the tests. Additionally, a user of a website offering free services may be asked to solve a CAPTCHA for another website before accessing the free services.

Some CAPTCHA implementations may use only a small fixed pool of CAPTCHA images. Eventually, when enough CAPTCHA image solutions have been collected by an attacker over a period of time, the CAPTCHA may be broken by simply looking up solutions in a table.

U.S. Patent Application Publication No. 2008/0009345 to Bailey et al. discloses a gaming system that uses a CAPTCHA to authenticate a user. Other references, such as U.S. Patent Application Publication No. 2009/0132424 to Kendrick et al., U.S. Patent Application Publication No. 2009/0153292 to Farb, and U.S. Pat. No. 7,552,467 to Lindsay disclose using a CAPTCHA to authenticate or verify a user. U.S. Patent Application Publication No. 2006/0047766 to Spadea, III discloses using a CAPTCHA to verify a sender of an email.

A CAPTCHA may be inconvenient to a user. For example, a user may be diverted from a particular task to enter the letters and/or the digits of the CAPTCHA. In many instances, the user may have to reenter the letters, or solve the CAPTCHA again during a period of inactivity, or when a user inadvertently uses a browser's back button. The same holds true when a user may request a bulk amount of data or make a large amount of requests, where each request may require completion of a CAPTCHA.

SUMMARY OF THE INVENTION

In view of the foregoing background, it is therefore an object of the present invention to provide human presence verification with increased speed and accuracy, and with reduced user interaction.

This and other objects, features, and advantages in accordance with the present invention are provided by an electronic device that may include a communications interface, a user prompting device, a biometric sensor, and a controller that performs biometric spoof detection with the biometric sensor. The controller may also receive a request for human presence verification from a remote device via the communications interface, for example, and prompt the user with the user prompting device for a verification action using the biometric sensor based upon receiving the request.

The controller may also determine that the user has completed the verification action using the biometric sensor in response to the prompting, and based upon the biometric spoof detection. The controller may further send a response to the remote device via the communications interface and based upon determining that the user has completed the verification action, for example. Accordingly, the electronic device reduces the time and interaction and increases accuracy for verifying a human presence by including a biometric sensor with spoof detection in contrast to manually solving a human presence verification test, for example, a CAPTCHA.

The biometric sensor may include a biometric finger sensor, for example. The controller may perform biometric spoof detection based upon impedance sensing, for example. The verification action may include removing the finger from the biometric finger sensor and repositioning the finger adjacent the biometric finger sensor, for example.

In some advantageous embodiments, the controller may also send a notification to the remote device via the communications interface indicating that the biometric sensor is coupled to the controller. This advantageously allows human verification to be made via the biometric sensor as opposed to a keyboard, for example, to thereby reduce the time spent for verification, and to thus improve the overall user experience. The controller may prompt the user with a CAPTCHA request, for example, so that the biometric sensor can be used to bypass the CAPTCHA request.

The controller may perform the biometric spoof detection prior to the determining. Alternatively, the controller may perform the biometric spoof detection during the determining. The controller may also determine that the user has completed the verification action using the biometric sensor within a predetermined time of the prompting, for example, to add reliability.

The communications interface may be configured to communicate over the Internet. And, the user prompting device may include at least one of a display and an audible indicator, for example.

In another embodiment, the electronic device may also send a notification to a remote device via the communications interface that a biometric finger sensor is coupled to the controller. The controller may receive a request for human presence verification from the remote device via the communications interface, and prompt the user with the user prompting device for a verification action using the biometric finger sensor based upon receiving the request for human presence verification, for example. This advantageously, may reduce the amount of time for performing a human verification action by removing a prompt for input from another device, such as a keyboard, for example, and providing a direct prompt to use the finger biometric sensor.

A method aspect is directed to verifying a human presence using an electronic device. The electronic device may include a communications interface, a user prompting device, a biometric sensor, and a controller. The method may include performing biometric spoof detection with the biometric sensor. The method may also include receiving a request for human presence verification from a remote device via the communications interface, and prompting the user with the user prompting device for a verification action using the biometric sensor based upon receiving the request.

The method may further include determining that the user has completed the verification action using the biometric sensor in response to the prompting, and based upon the biometric spoof detection. The method may also include sending a response to the remote device via the communications interface and based upon determining that the user has completed the verification action.

Another method aspect is directed to verifying a human presence using the electronic device. The method may include sending a notification to a remote device via the communications interface that the biometric finger sensor is coupled to the controller. The method may also include receiving a request for human presence verification from the remote device via the communications interface and prompting the user with the user prompting device for a verification action using the biometric finger sensor based upon receiving the request, for example.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
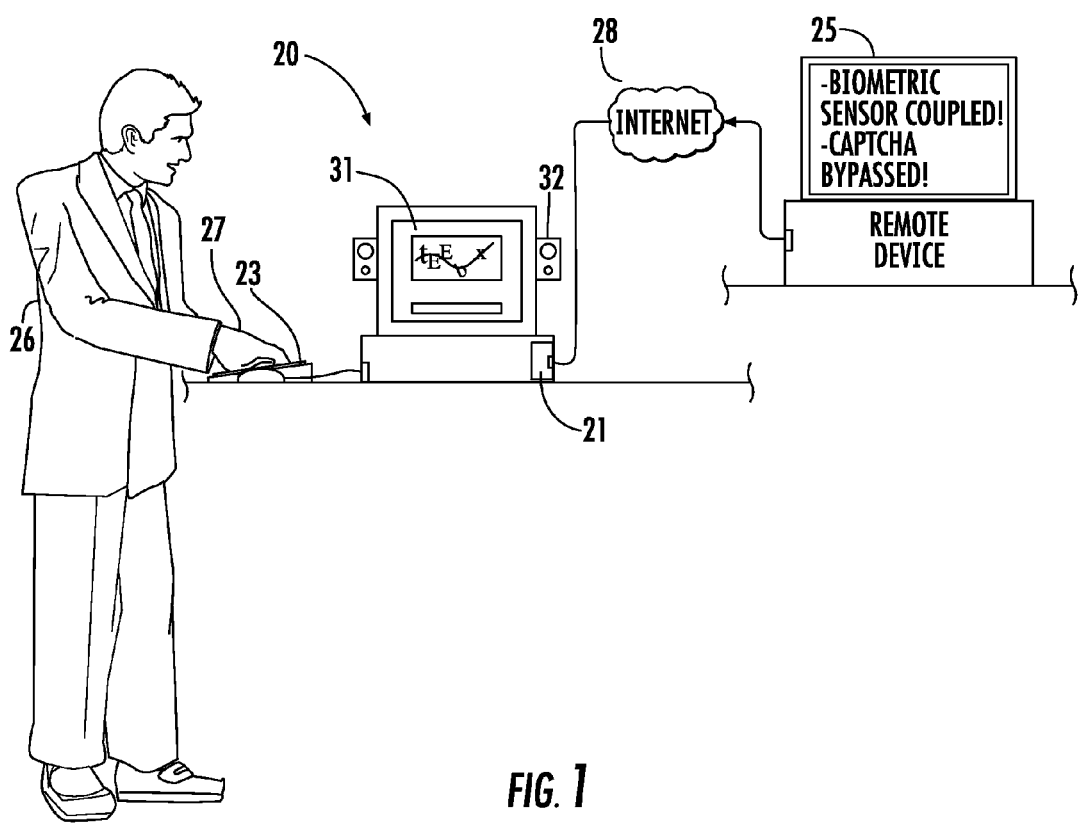
FIG. 1 is a diagram of a human presence verification system according to the present invention.
Figure 2:
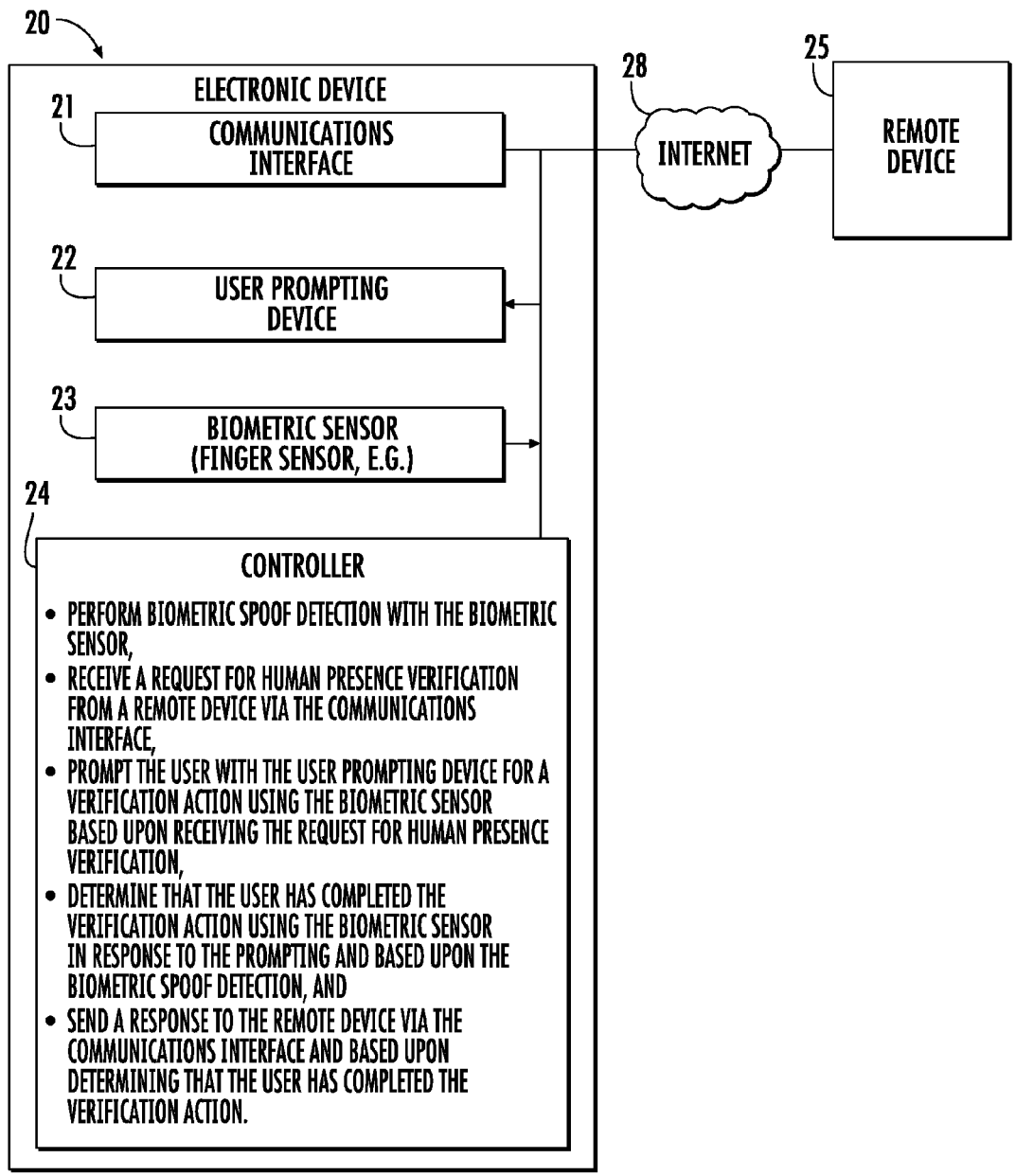
FIG. 2 is a schematic block diagram of the human presence verification system of FIG. 1.

Referring initially to FIGS. 1 and 2, an electronic device 20 illustratively includes a communications interface 21, a user prompting device 22, and a biometric sensor 23. The electronic device 20 also includes a controller 24 cooperating with the communications interface 21, user prompting device 22, and biometric sensor 23.

The user prompting device 22 illustratively includes a display 31. As will be appreciated by those skilled in the art, the user prompting device 22 may also include an audible indicator 32, for example, an audio transducer. The user prompting device 22 may be another indicator or may be a combination of indicators, as will be appreciated by those skilled in the art.

The communications interface 21 is configured to communicate over the Internet 28, for example. The communications interface 21 may be configured to communicate over a wired or a wireless network. Additionally, communications over the communications interface 21 may include a secure sockets layer (SSL), as will be appreciated by those skilled in the art.

The biometric sensor 23 is illustratively a biometric finger sensor. The biometric sensor 23 may be a slide sensor. As will be appreciated by those skilled in the art, the biometric sensor 23 may be a retinal biometric sensor, a voice sensor, or other biometric sensor.

The controller 24 performs biometric spoof detection with the biometric sensor 23. For example, the controller 24 may perform the biometric spoof detection based upon impedance sensing. Additional biometric spoof detection methods are described in U.S. Pat. No. 5,953,441 to Setlak et al., and assigned to the assignee of the present application, the entire contents of which are herein incorporated by reference. Similarly, additional spoof detection methods can be found in U.S. Publication No. 2009/0316963, published Dec. 24, 2009 to Boshra, and also assigned to the assignee of the present application, the entire contents of which are herein incorporated by reference.

The controller 24 receives a request for human presence verification from a remote device 25 via the communications interface. The remote device 25 may be a web server, for example, and may include a website that may request human presence verification before allowing a user to proceed. For example, the controller 24 may include a browser plug-in that may cooperate with the website of the remote device 25.

The controller 24 also prompts a user 26, with the user prompting device 22, for a verification action using the biometric sensor 23 based upon receiving the request for human presence verification. For example, the user 26 may be prompted via the display 31 with a visual test or via the audio indictor 32, for example, computer speaker, with an audible test. The user 26 may be prompted with other tests for human presence verification, for example, a check box, or other tests, as will be appreciated by those skilled in the art. In some embodiments, prompting the user may be with a Completely Automated Public Turing test to tell Computers and Humans Apart (CAPTCHA) request, and the controller 24 may bypass the CAPTCHA request with the biometric sensor 23. Advantageously, this may reduce the time for the user to verify that he is a human being, and thus reduce network traffic and associated activities caused by bots.

The verification action may include removing a user's finger 27 from the biometric finger sensor 23 and repositioning the user's finger adjacent the biometric finger sensor 23. For example, such removal and repositioning of the user's finger 27 may occur when the user 26 is using the biometric sensor 23 for authentication or navigation functions when prompted for verification. This advantageously may reduce the verification time, as the user may already be using the biometric sensor for navigation and/or authentication. Other verification actions may be used.

The controller 24 determines that the user 26 has completed the verification action using the biometric sensor 23 in response to the prompting and based upon the biometric spoof detection. Performing the biometric spoof detection and basing the determining thereon advantageously improves the accuracy of the human presence verification and reduces an amount of false human presence verifications that may be caused by spoof fingers, for example.

In some embodiments, the controller 24 may perform the biometric spoof detection prior to the determining, for example, when biometric spoof detection is performed as part of a navigation or authentication action to thereby further reduce the time for verification. Additionally, or alternatively, in other embodiments, the controller 24 may perform the biometric spoof detection during the determining.

Additionally, the controller 24 may also optionally determine that the user 26 has completed the verification action using the biometric sensor 23 within a predetermined time of the prompting, for example. For example, if the verification action is not completed within the predetermined amount of time of prompting, a determination may be made that no human presence exists.

The controller 24 also sends a response to the remote device 25 via the communications interface 21 and based upon determining that the user 26 has completed the verification action. In some embodiments, the response may include a notification to the remote device 25 that a human presence has been verified. The controller 24 may also send a notification to the remote device 25 via the communications interface 21 that the biometric sensor 23 is coupled to the controller 24. This may advantageously allow the remote device 25 that may be expecting the verification via another input device or interface, for example, a keyboard, to expect the verification via the biometric sensor 23.

Figure 3:
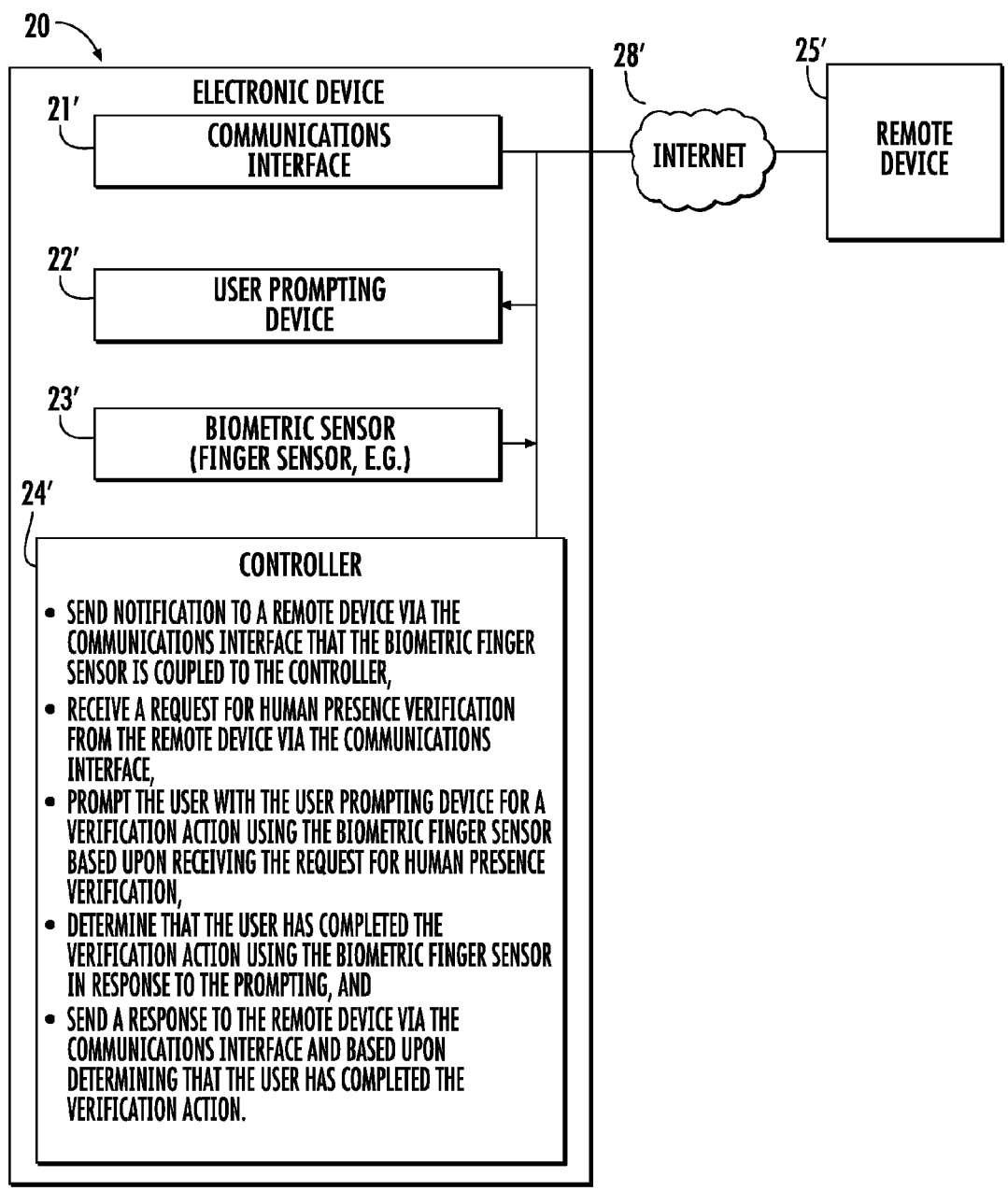
FIG. 3 is a schematic block diagram of another embodiment of the human presence verification system in accordance with the present invention.

Referring now to FIG. 3, in another embodiment of the human verification system 20' the controller 24' sends a notification to the remote device 25' via the communications interface 21' that the biometric finger sensor 23' is coupled to the controller. This may advantageously allow a remote device 25' that may be expecting the verification via another input device or interface, for example, a keyboard, to expect the verification via the biometric finger sensor 23'.

The controller 24' also receives a request for human presence verification from the remote device 25' via the communications interface 21', and prompts the user 26' with the user prompting device 22' for a verification action using the biometric finger sensor 23' based upon receiving the request for human presence verification.

It should be noted that in the embodiment described with reference to FIG. 3, the controller 24' does not necessarily perform biometric spoof detection. However, as will be appreciated by those skilled in the art, the controller 24' may perform biometric spoof detection as well.

Figure 4:
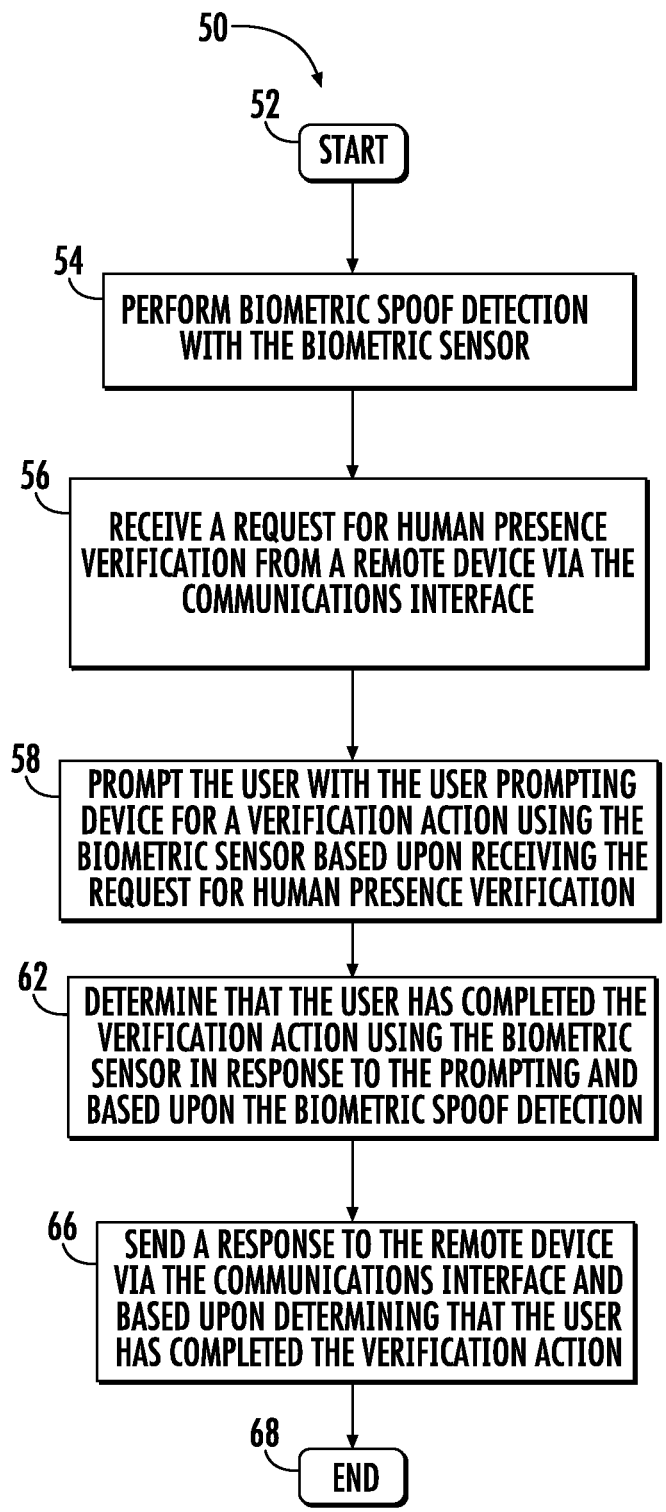
FIG. 4 is a flow chart of a method of verifying a human presence according to the present invention.

With reference to flowchart 50 in FIG. 4, a method aspect is directed to a method of verifying a human presence using an electronic device. The electronic device 20 includes a communications interface 21, a user prompting device 22, a biometric sensor 23, and a controller 24 cooperating with the communications interface, user prompting device, and biometric sensor. The biometric sensor 23 may be a biometric finger sensor, for example. Other biometric sensors may be used.

Beginning at Block 52, the method includes performing biometric spoof detection with the biometric sensor (Block 54). The biometric spoof detection may be performed based upon impedance matching. Spoof detection may be performed using other methods, as will be appreciated by those skilled in the art. The method also includes receiving a request for human presence verification from a remote device 25 via the communications interface 21 and over the Internet 28 (Block 56).

The method includes, at Block 58 prompting the user with the user prompting device 22 for a verification action using the biometric sensor based upon receiving the request for human presence verification.

The method also includes at Block 62 determining that the user has completed the verification action using the biometric sensor in response to the prompting and based upon the biometric spoof detection. In the case of the biometric sensor 23 being a biometric finger sensor, the verification action may include removing the finger 27 from the biometric sensor and repositioning the finger adjacent the biometric finger sensor, for example.

At Block 66, a response is sent to the remote device 25 via the communications interface and based upon determining that the user has completed the verification action. The method ends at Block 68.

Figure 5:
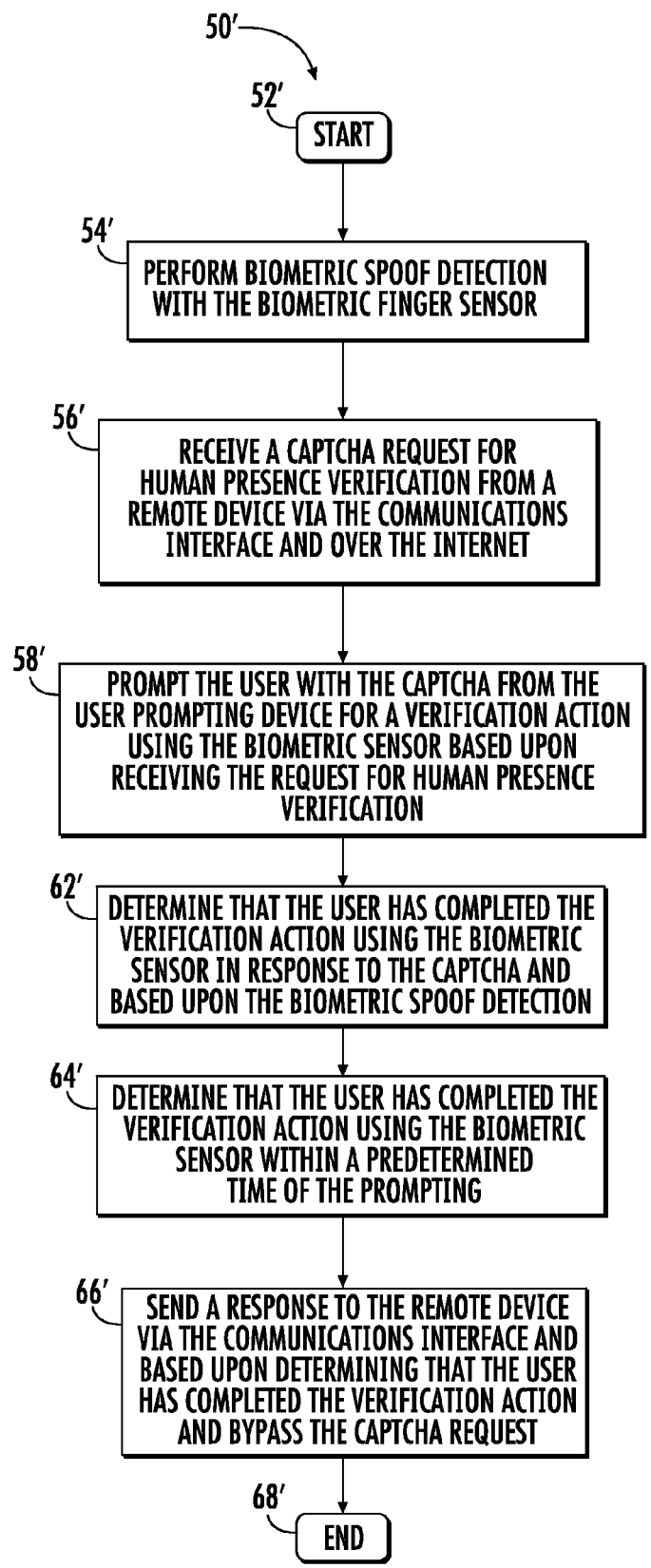
FIG. 5 is a more detailed flow chart of the method illustrated in FIG. 4.

Referring now to the flowchart 50' in FIG. 5, in another embodiment of the method of verifying a human presence, the biometric sensor 23 may be a finger biometric sensor. The request received at Block 56' may be a CAPTCHA request, and the controller 24 may prompt the user with the CAPTCHA request at Block 58'. At Block 64', the method may optionally determine that the user 26 has completed the verification action using the biometric finger sensor 23 within a predetermined time of the prompting. Based upon determining that the user has completed the verification action, the CAPTCHA request may be bypassed with the biometric sensor 23 at Block 66' before ending at Block 68'.

Figure 6:
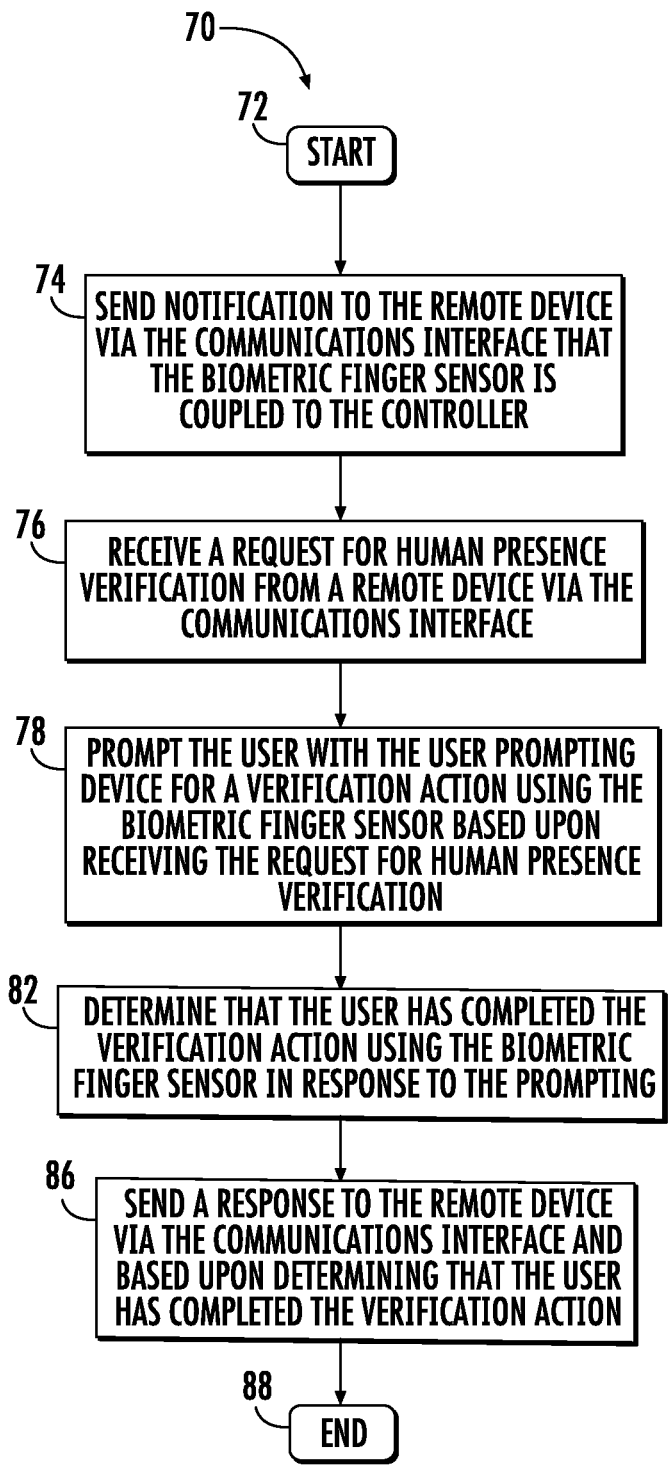
FIG. 6 is a flow chart of a method of verifying a human presence according to another embodiment of the present invention.

Referring now to the flowchart 70 in FIG. 6, another embodiment of a method is directed to verifying a human presence using an electronic device 20'. The electronic device 20' includes a communications interface 21', a user prompting device 22', a biometric finger sensor 23', and a controller 24' cooperating with the communications interface, user prompting device, and biometric finger sensor.

Beginning at Block 72, the method includes sending a notification to the remote device 25' via the communications interface 21' that the biometric finger sensor is coupled to the controller 24' (Block 74). The method also includes receiving a request for human presence verification from a remote device 25' via the communications interface 21'(Block 76).

The method includes, at Block 78 prompting the user with the user prompting device 22' for a verification action using the biometric finger sensor based upon receiving the request for human presence verification. The method also includes at Block 82 determining that the user has completed the verification action using the biometric finger sensor 23' in response to the prompting.

At Block 86, a response is sent to the remote device 25' via the communications interface 21' and based upon determining that the user has completed the verification action, before ending at Block 88.

Figure 7:
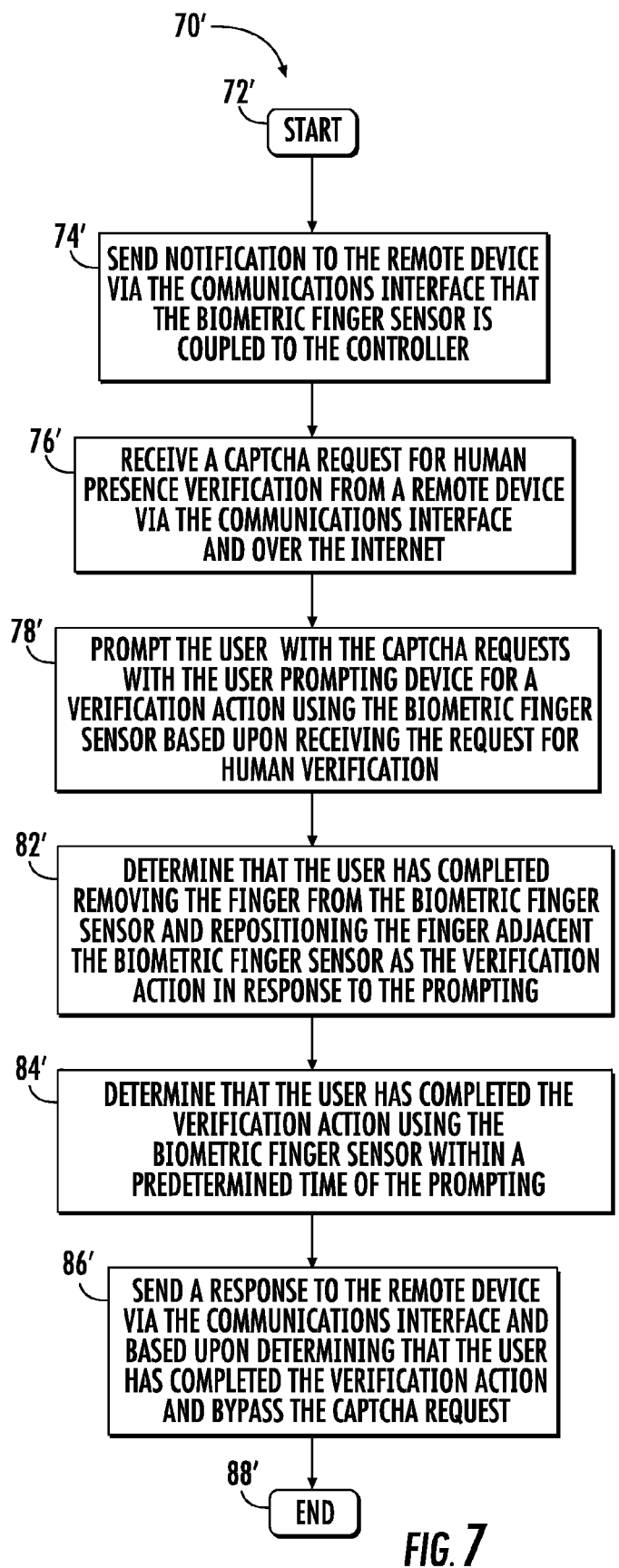
FIG. 7 is a more detailed flow chart of the method illustrated in FIG. 6.

Referring now to the flowchart 70' in FIG. 7, in another embodiment of the method of verifying a human presence, the request received at Block 76' may be received via the Internet 28' and may be a CAPTCHA request. At Block 78' the controller 24' may prompt the user with the CAPTCHA request. The verification action may include removing the finger 27' from the biometric finger sensor 23' and repositioning the finger adjacent the biometric finger sensor (Block 82'). The method also may optionally include, at Block 84', determining that the user 26' has completed the verification action using the biometric finger sensor 23' within a predetermined time of the prompting. Based upon determining that the user has completed the verification action, the CAPTCHA request may be bypassed with the biometric finger sensor 23' at Block 86' before ending at Block 88'.

In the embodiments described with reference to FIGS. 6 and 7, biometric spoof detection is not performed. However, as will appreciated by those skilled in the art, the methods described with reference to FIGS. 4 and 5 may be used in conjunction or combination with the methods described with reference to FIGS. 6 and 7.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
a communications interface;
a user prompting device;
a biometric sensor; and
a controller capable of
performing biometric spoof detection with said biometric sensor,
receiving a first request for a user-independent human presence verification from a remote device via said communications interface,
sending a notification to the remote device via said communications interface that said biometric sensor is coupled to said controller,
prompting a user, via said user prompting device, with a second request for a verification action using said biometric sensor based upon receiving the first request for a user-independent human presence verification,
determining that the user has completed the verification action using said biometric sensor in response to the prompting and based upon the biometric spoof detection and without performing a biometric authentication, and
sending a response corresponding to the second request verification for the verification action using said biometric sensor to the remote device via said communications interface and based upon the determining to thereby bypass processing of the received first request.

2. The electronic device according to claim 1 wherein said biometric sensor comprises a biometric finger sensor.

3. The electronic device according to claim 2 wherein said controller is capable of performing biometric spoof detection based upon impedance sensing.

4. The electronic device according to claim 2 wherein the verification action comprises removing a finger from said biometric finger sensor and repositioning the finger adjacent said biometric finger sensor.

5. The electronic device according to claim 1 wherein said controller is capable of performing the biometric spoof detection prior to the determining.

6. The electronic device according to claim 1 wherein said controller is capable of determining that the user has completed the verification action using said biometric sensor within a predetermined time of the prompting.

7. The electronic device according to claim 1 wherein said communications interface is capable of communicating over the Internet.

8. The electronic device according to claim 1 wherein said user prompting device comprises at least one of a display and an audible indicator.

9. A human presence verification system for an electronic device comprising a communications interface, and a user prompting device, the system comprising:
a biometric sensor; and
a controller capable of
performing biometric spoof detection with said biometric sensor,
receiving a first request for a user-independent human presence verification from a remote device via the communications interface,
sending a notification to the remote device via said communications interface that said biometric sensor is coupled to said controller,
prompting a user, via the user prompting device, with a second request for a verification action using said biometric sensor based upon receiving the first request for a user-independent human presence verification,
determining that the user has completed the verification action using said biometric sensor in response to the prompting and based upon the biometric spoof detection and without performing a biometric authentication, and
sending a response corresponding to the second request verification for the verification action using said biometric sensor to the remote device via the communications interface and based upon the determining to thereby bypass processing of the received first request.

10. The human presence verification system according to claim 9 wherein said biometric sensor comprises a biometric finger sensor.

11. The human presence verification system according to claim 10 wherein said controller is capable of performing biometric spoof detection based upon impedance sensing.

12. The human presence verification system according to claim 10 wherein the verification action comprises removing a finger from said biometric finger sensor and repositioning the finger adjacent said biometric finger sensor.

13. The human presence verification system according to claim 9 wherein said controller is capable of performing the biometric spoof detection prior to the determining.

14. The human presence verification system according to claim 9 wherein said controller is capable of determining that the user has completed the verification action using said biometric sensor within a predetermined time of the prompting.

15. A method of verifying a human presence using an electronic device comprising a communications interface, a user prompting device, a biometric sensor, and a controller cooperating with the communications interface, the user prompting device, and the biometric sensor, the method comprising:
performing biometric spoof detection with the biometric sensor;
receiving a first request for a user-independent human presence verification from a remote device via the communications interface;

sending a notification to the remote device via the communications interface that the biometric sensor is coupled to the controller;

prompting a user, via the user prompting device, with a second request for a verification action using the biometric sensor based upon receiving the first request for a user-independent human presence verification;

determining that the user has completed the verification action using the biometric sensor in response to the prompting and based upon the biometric spoof detection and without performing a biometric authentication; and sending a response corresponding to the second request verification for the verification action using the biometric sensor to the remote device via the communications interface and based upon the determining to thereby bypass processing of the received first request.

16. The method according to claim 15 wherein the biometric sensor comprises a biometric finger sensor.

17. The method according to claim 16 wherein performing biometric spoof detection comprises performing biometric spoof detection based upon impedance sensing.

18. The method according to claim 16 wherein the verification action comprises removing a finger from the biometric finger sensor and repositioning the finger adjacent the biometric finger sensor.

19. The method according to claim 15 wherein performing the biometric spoof detection is prior to the determining.

20. The method according to claim 15 wherein the determining is based upon the user completing the verification action using the biometric sensor within a predetermined time of the prompting.

* * * * *